US00RE41933E

(19) United States
(12) Reissued Patent
Cheng et al.

(10) Patent Number: US RE41,933 E
(45) Date of Reissued Patent: Nov. 16, 2010

(54) OPTICAL CONNECTOR ASSEMBLY WITH A LOW PROFILE

(75) Inventors: Yung Chang Cheng, Chung-Li (TW); Chung Hsin Mou, Shenzhen (CN); Nan Tsung Huang, Shenzhen (CN)

(73) Assignee: Hon Hai Precision Ind. Co., Ltd., Taipei Hsien (TW)

(21) Appl. No.: 11/544,037

(22) Filed: Oct. 5, 2006

Related U.S. Patent Documents

Reissue of:
(64) Patent No.: 6,799,898
Issued: Oct. 5, 2004
Appl. No.: 10/316,300
Filed: Dec. 10, 2002

(51) Int. Cl.
*G02B 6/36* (2006.01)

(52) U.S. Cl. ..... 385/56; 385/55
(58) Field of Classification Search ..... 385/71, 385/56, 59, 55; 439/353
See application file for complete search history.

(56) References Cited

U.S. PATENT DOCUMENTS 4,952,177 A * 8/1990 Drake et al. ..... 439/838
5,579,425 A * 11/1996 Lampert et al. ..... 385/59
5,675,682 A * 10/1997 De Marchi ..... 385/77
6,017,153 A * 1/2000 Carlisle et al. ..... 385/56
6,024,498 A * 2/2000 Carlisle et al. ..... 385/56
6,116,938 A * 9/2000 Myer et al. ..... 439/353
6,217,354 B1 * 4/2001 Fencl et al. ..... 439/157
6,287,018 B1 * 9/2001 Andrews et al. ..... 385/60
6,318,903 B1 * 11/2001 Andrews et al. ..... 385/77
6,357,934 B1 * 3/2002 Driscoll et al. ..... 385/86
6,550,979 B1 * 4/2003 Fleenor et al. ..... 385/78
6,565,262 B2 * 5/2003 Childers et al. ..... 385/76
6,588,938 B1 * 7/2003 Lampert et al. ..... 385/58
6,638,085 B1 * 10/2003 Martin ..... 439/157
6,840,680 B1 * 1/2005 Chiu et al. ..... 385/53
6,913,392 B2 * 7/2005 Grzegorzewska et al. ..... 385/60
7,018,108 B2 * 3/2006 Makhlin et al. ..... 385/78
7,281,859 B2 * 10/2007 Mudd et al. ..... 385/76
7,311,539 B2 * 12/2007 Pepe et al. ..... 439/219
2003/0190123 A1 * 10/2003 Kahle et al. ..... 385/59

* cited by examiner

*Primary Examiner*—Chandrika Prasad
(74) *Attorney, Agent, or Firm*—Storm LLP; Paul V. Storm, Esq.; Mark D. Perdue, Esq.

(57) ABSTRACT

An optical connector assembly (2) has two optical connectors (3) and a combiner (5). Each optical connector has a connector body (30) with an angled latching arm (4) formed on the connector body. The latching arm has a fixed end (41) on the connector body and a free distal end. A groove (430) is defined on the distal end. The combiner has a combiner body (6) holding the optical connectors and a cantilevered trigger arm (7). The trigger arm has a fixed end on the combiner body and a free distal end. A rod (72) is formed on the distal end of the trigger arm, and is received in the grooves of the optical connectors.

54 Claims, 4 Drawing Sheets

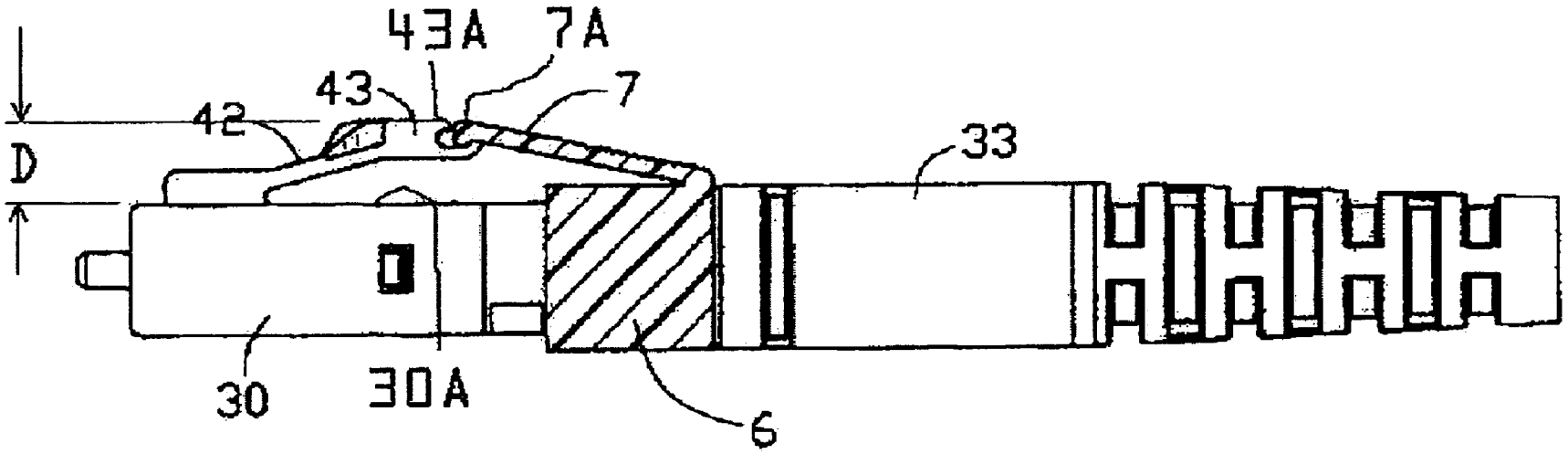
FIG. 6
Amended

OPTICAL CONNECTOR ASSEMBLY WITH A LOW PROFILE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an LC-type optical connector assembly, and particularly to a low profile LC-type optical connector assembly.

2. Description of Related Art

Optical fiber connectors are widely used in optical communication systems to join optical fibers together to form a longer length fiber run, or to connect an optical fiber to a device. An SFF (Small Form Factor) and an SFP (Small Form-factor Pluggable) standard were introduced into the industry to meet a demand for high-density communication ports. An LC-type optical connector is a kind of SFF standard optical connector which can be used to connect with an SFF or an SFP transceiver.

Referring to FIG. 1, a traditional LC-type optical connector assembly 1 comprises two optical connectors 10 and a combiner 13 holding the optical connectors 10 together. Each optical connector 10 further comprises a connector body 11, an optical fiber (not labeled) retained in the connector body 11 and a latching arm 12 adapted to latch the connector body 11 with one of two receptacles (not shown) of a transceiver (not shown). The latching arm 12 further comprises a free distal end 122 and a fixed end 121 on an outer surface (not labeled) of the connector body 11. The distal end 122 of the latching arm 12 extends [slantways] *at an angle* from the fixed end 121.

Referring also to FIG. 2, the combiner 13 comprises a main body 131 and a cantilevered trigger arm 132. The main body 131 further defines two cylindrical openings (not labeled) for receiving two optical connectors 10 therein. The trigger arm 132 includes a fixed end (not labeled) on the main body 131 and a free end (not labeled) extending [slantways] *at an angle* from the fixed end of the trigger arm 132. In assembly, the combiner 13 holds the optical connectors 10 in the openings, respectively. The free end of the trigger arm 132 overlies the distal ends 122 of the latching arms 12 on the optical connectors 10. Thus, the connector assembly 1 fixes two optical fibers together, and the connector assembly 1 can be used to connect with a transceiver (not shown) for transmitting and receiving optical signals at the same time.

However, the latching arm 12 extends [slantways] from the connector body 11 at a relatively high angle, which results in a large height of the connector assembly 1. Furthermore, the free end of the trigger arm 132 overlies the distal end 122 of the latching arm 12, which further increases the height of the connector assembly 1. This kind of high profile connector assembly is not suitable to connect with a transceiver in a device having high-density communication ports.

Therefore, an improved optical connector assembly is required to overcome the disadvantage described above.

SUMMARY OF THE INVENTION

Accordingly, an object of the present invention is to provide a low profile optical connector assembly.

In order to achieve the object set forth, an optical connector assembly comprises two optical connectors and a combiner. Each optical connector comprises a connector body and an angled latching arm formed on the connector body. The latching arm further comprises a fixed end on the connector body and a free distal end, and a groove is defined on the distal end. The combiner comprises a combiner body holding the optical connectors and a cantilevered trigger arm. The trigger arm comprises a fixed end on the combiner body and a free distal end. A rod is formed on the distal end of the trigger arm, and is received in the grooves of the latching arms.

Other objects, advantages and novel features of the invention will become more apparent from the following detailed description when taken in conjunction with the accompanying drawings.

BRIEF DESCRIPTION OF THE DRAWINGS

FIG. 6 is a cross-section view of the optical connector assembly of FIG. 3, taken along line VI—VI of FIG. 3.

DETAILED DESCRIPTION OF THE INVENTION

Figure 1:
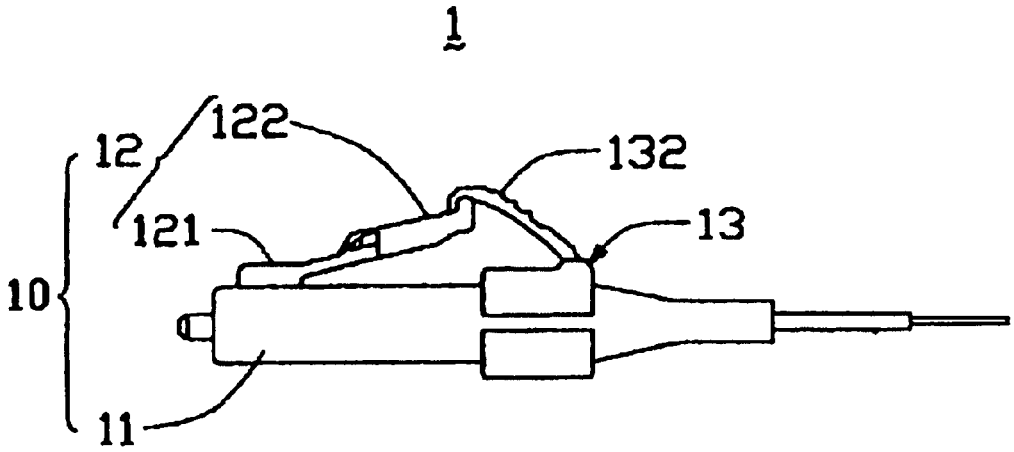
FIG. 1 (PRIOR ART)
FIG. 1 is a side view of a traditional optical connector assembly having a combiner.
Figure 2:
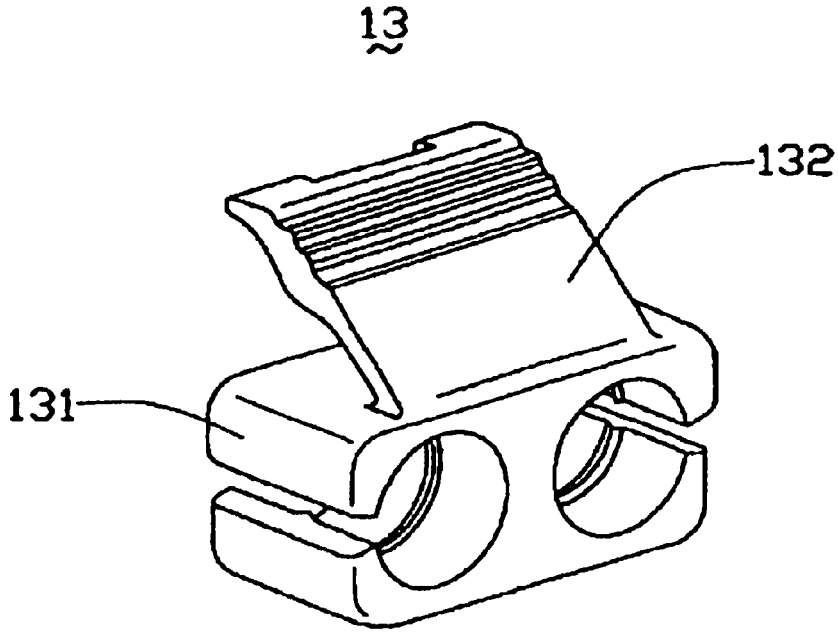
FIG. 2 (PRIOR ART)
FIG. 2 is a perspective view of the combiner of FIG. 1.
Figure 3:
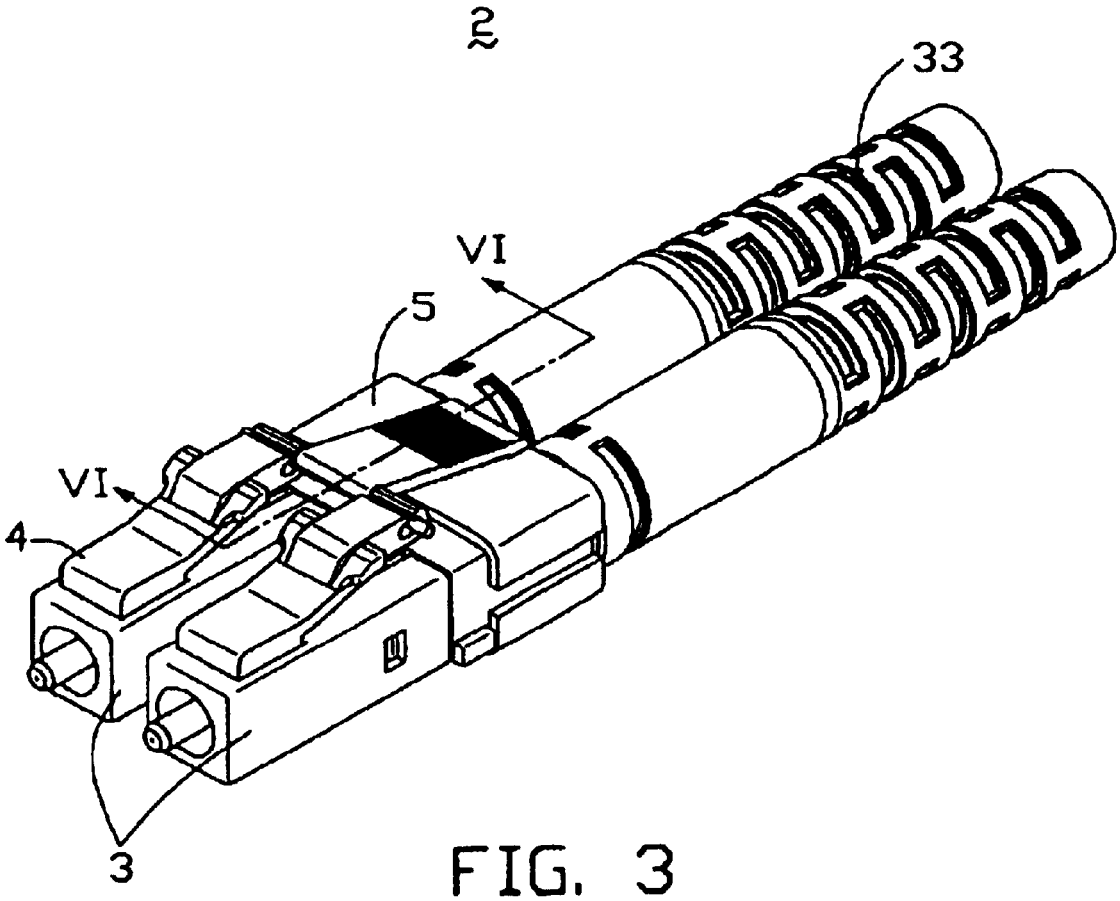
FIG. 3 is a perspective view of an optical connector assembly in accordance with the present invention.

Referring to FIG. 3, an LC-type optical connector assembly 2 in accordance with the present invention comprises two optical connectors 3 and a combiner 5 holding the optical connectors 3.

Figure 4:
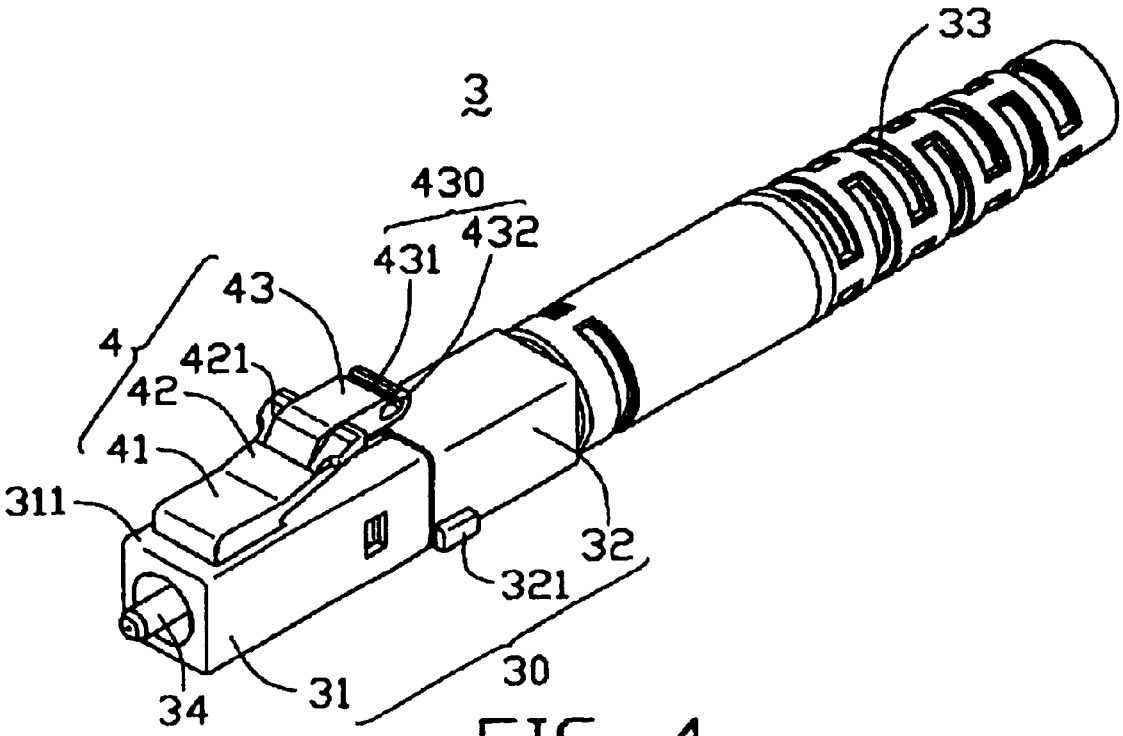
FIG. 4 is a perspective view of an optical connector of the optical connector assembly of FIG. 3.

Referring to FIG. 4, each of the optical connectors 3 comprises a elongated connector body 30, a ferrule 34 retaining an optical fiber (not shown) therein and a cylindrical boot 33 attachable to a rear end 32 of the connector body 30. The ferrule 34 is received in the connector body 30 and extends outwardly from a front end 31 of the connector body 30. The boot 33 also retains the optical fiber therein, and is separate from the connector body 30. The boot 33 is preferably made of rubber, and prevents the optical fiber from over-bending after the boot 33 is fixed on the connector body 30.

The connector body 30 comprises an angled latching arm 4 extending [slantways] upwardly at a shallow angle from the connector body 30 and adjacent the front end 31. The latching arm 4 comprises a fixed end 41 formed on an upper surface 311 of the connector body 30 and a free distal end (not labeled). The latching arm 4 further comprises a first portion 42 extending [slantways] *at an angle* from the fixed end 41 and second portion 43 substantially parallel to the connector body 30. Two tabs 421 extend laterally from two sides of a rear end (not labeled) of the first portion 42, where the first and second portions 42, 43 are joined at an obtuse angle. The tabs 421 are adapted to engage with one of two receptacles (not shown) of a transceiver (not shown) to latch the optical connector 3 therein, and can be detached therefrom by manipulating the combiner 5, which will be described in detail hereinafter. A groove 430 is laterally defined on the distal end of the latching arm 4. The groove 430 further comprises an entrance aperture 431 and a receiving slot 432 in communication with the entrance aperture 431. A protrusion 321 extends from a side surface (not labeled) of the connector body 30 for positioning the combiner 5.

Figure 5:
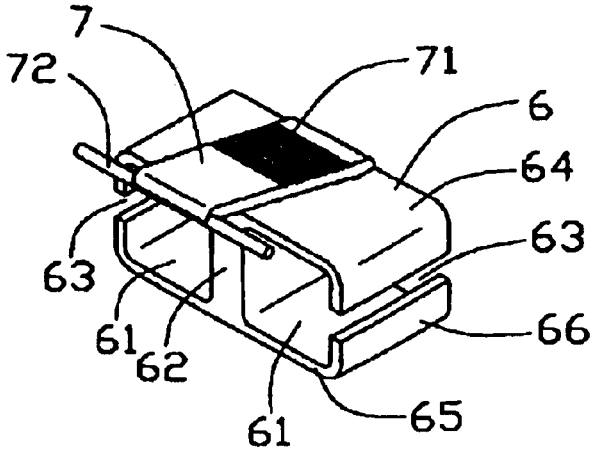
FIG. 5 is a perspective view of a combiner of the optical connector assembly of FIG. 3.

Referring also to FIG. 5, the combiner 5 comprises a combiner body 6 for holding the optical connectors 3 and a cantilevered trigger arm 7. The combiner body 6 comprises an upper wall 64, a bottom wall 65, two side walls 66 and a central beam 62 connecting the upper wall 64 with the bottom wall 65. The upper, bottom, and side walls 64, 65, 66, together with the central beam 62 defines two rectangular openings 61 through the combiner 5, each for receiving one of the optical connectors 3 therein. Two slots 63 are defined in corresponding side walls 66, and each is in communication with a corresponding opening 61.

The trigger arm 7 is T-shaped, and comprises a fixed end (not labeled) formed on the combiner body 6 and a free distal end (not labeled) extending [slantways] *at an angle* from the fixed end. The trigger arm 7 has a generally same height as the latching arm 4. A cylindrical rod 72 extends laterally on *either side of* the distal end of the trigger arm 7. The trigger arm 7 further comprises a serrated outer surface 71 to aid manual operation.

Referring to FIGS. 3–6, in assembly, the optical fibers (not shown) attached to the two optical connectors 3 are inserted into the respective openings 61 through the slots 63. The combiner body 6 is pushed forward over the rear ends 32 of the connector bodies 30, and is stopped by the protrusions 321. Thus, the combiner body 6 grasps the connector bodies 30 of the optical connectors 3. After that, the boots 33 are pushed forward, and are fixed on the rear ends 32 of the connector bodies 30, respectively. The protrusions 321 and the boots 33 cooperate to position the combiner therebetween. In the meantime, the rod 72 is pushed into the receiving slot 432 through the entrance aperture 431 of each connector 3, and is slideably received in the receiving slots 432. The entrance aperture 431 is constricted enough to prevent the rod 72 from coming out of the groove 430 accidentally. When the trigger arm 7 is pressed on the serrated surface 71, the distal end (not labeled) of the trigger arm 7 elastically moves downward, and the rod 72 on the distal end of the trigger arm 7 urges the latching arms 4 to bend downward. The tabs 421 on the latching arms 4 also move downward, and are detached from corresponding receptacles (not shown) of a transceiver (not shown).

As described above, the angled latching arm 4 extends [slantways] at a shallow angle from the connector body 30, and the trigger arm 7 has a generally same height (*or the uppermost surfaces 43A, 7A of each of latching arms 4 and trigger arm 7 extend an equal distance "D" in FIG. 6 from the upper surface 30A of the connector body*) as the latching arm 4. Thus, the optical connector assembly 2 in accordance with the present invention achieves a low profile, which facilitates connection of the optical connector assembly 2 with a transceiver in a high-density communication ports environment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical connector assembly comprising:

two optical connectors, wherein each of the optical connectors comprises a connector body with an angled latching arm formed on the connector body, the latching arm further comprising a fixed end on the connector body and a free distal end, a groove being defined through the distal end; and a combiner comprising a combiner body holding the optical connectors and a cantilevered trigger arm, the trigger arm further comprising a fixed end on the combiner body and a free distal end, a rod being formed on the distal end of the trigger arm;

wherein the rod is received in the grooves of the latching arms.

2. The optical connector assembly as described in claim 1, wherein each of the optical connectors further comprises a ferrule extending outwardly from a first end of the connector body and a boot being attachable on a second end of the connector body.

3. The optical connector assembly as described in claim 1, wherein each latching arm further comprises a first portion extending [slantways] *at a selected angle* from the fixed end and a second portion substantially parallel to the corresponding connector body, and the first and second portions are joined at an obtuse angle.

4. The optical connector assembly as described in claim 1, wherein the latching arm extends [slantways] at a shallow angle from an outer surface of the corresponding connector body.

5. The optical connector assembly as described in claim 2, wherein the connector body is elongated in shape.

6. The optical connector assembly as described in claim 5, wherein the connector body further comprises a protrusion extending from an outer surface of the connector body.

7. The optical connector assembly as described in claim 6, wherein the protrusion and the boot of the optical connector cooperate to position the combiner therebetween.

8. The optical connector assembly as described in claim 1, wherein the groove of each optical connector comprises an entrance aperture and a receiving slot in communication with the entrance aperture, wherein the entrance aperture allows entrance of the rod into the receiving slot, and wherein the entrance aperture is constricted so as to prevent the rod from coming out of the groove accidentally, and the rod is slideably received in the receiving slot.

9. The optical connector assembly as described in claim 1, wherein the combiner body defines two openings therein, each for receiving one of the optical connectors therein.

10. The optical connector assembly as described in claim 9, wherein the openings of the combiner body are rectangular in shape.

11. The optical connector assembly as described in claim 10, wherein two slots are defined through two respective side walls of the combiner body.

12. The optical connector assembly as described in claim 11, wherein each slot is in communication with a corresponding opening.

13. The optical connector assembly as described in claim 1, wherein the trigger arm extends slantways from the combiner body.

14. The optical connector assembly as described in claim 13, wherein the trigger arm further comprises a serrated outer surface for manual pressing.

15. The optical connector assembly as described in claim 14, wherein the trigger arm is T-shaped.

16. The optical connector assembly as described in claim 15, wherein the rod extends laterally on the distal end of the trigger arm.

17. A connector assembly with latching, comprising:

at least one connector having a connector body with a deflectable, *integrally formed* latching arm [integrally]

extending rearwardly from a front edge region thereof and [terminated] *terminating* with a first distal end; and a fastener located at a rear portion of said connector body with a deflectable, *integrally formed* cantilever trigger arm [integrally] extending forwardly from a rear edge region [thereof] *of the fastener* and [terminated] *terminating* with a second distal end[;], *each of the trigger arm and latching arm having an uppermost surface,* wherein [said] *the* first distal end and [said] *the* second distal end are [pivotally assembled] *releasably secured* with each other *and the uppermost surfaces of the trigger arm and latching arm extend an equal distance from an upper surface of the connector body.*

18. The connector assembly as described in claim 17, wherein [said] *the* fastener is discrete from [said] *the* connector body.

19. The connector assembly as described in claim 18, wherein there are two [said] connectors, and [said] *the* two connectors are commonly [pivotally assembled] *releasably secured* to [said] *the* fastener.

20. The connector assembly as described in claim 19, wherein the rear portion of the connector body of each of [said] *the* two connectors are enclosed by [said] *the* fastener so that said fastener functions as a combiner.

*21. An optical connector assembly comprising:*

*a pair of optical connectors, each of the optical connectors having a connector body and a resilient latching arm secured to an upper surface of the connector body, the latching arm having a distal end and an uppermost surface;*

*a combiner securing together the optical connectors;*

*a resilient trigger arm carried by the combiner and having a free end and an uppermost surface; and*

*a linking member coupling each of the free ends of the latching arms with the free end of the trigger arm, wherein the uppermost surfaces of the trigger and latching arms extend an equal distance from the upper surface of the connector body and depression of the trigger arm causes depression of each of the latching arms.*

*22. The optical connector assembly as described in claim 21, wherein each of the optical connectors further comprises:*

*a ferrule extending outwardly from a first end of the connector body and a boot being attachable on a second end of the connector body.*

*23. The optical connector assembly as described in claim 21, wherein each latching arm further comprises:*

*a first portion extending at an angle from the connector body; and*

*a second portion extending from the first portion substantially parallel to the corresponding connector body, wherein the first and second portions are joined at an obtuse angle.*

*24. The optical connector assembly as described in claim 21, wherein the latching arm extends at a shallow angle from the upper surface of the corresponding connector body.*

*25. The optical connector assembly as described in claim 22, wherein the connector body is elongated in shape.*

*26. The optical connector assembly as described in claim 25, wherein the connector body includes a protrusion extending from its outer surface.*

*27. The optical connector assembly as described in claim 26, wherein the protrusion and the boot of the optical connector cooperate to position the optical connectors within the combiner.*

*28. The optical connector assembly as described in claim 21, wherein the linking member further comprises:*

*a rod having each end extending from each side of the free end of the trigger arm; and*

*a groove formed in each free end of each latching member, wherein the groove releasably receives one end of the rod.*

*29. The optical connector assembly as described in claim 28, wherein the groove further comprises:*

*an entrance aperture and a receiving slot in communication with the entrance aperture, wherein the entrance aperture allows entrance of the rod into the receiving slot, and wherein the entrance aperture is constricted so as to prevent the rod from coming out of the groove accidentally, and the rod is slideably received in the receiving slot.*

*30. The optical connector assembly as described in claim 21, wherein the combiner defines two openings, each for receiving one of the optical connectors therein.*

*31. The optical connector assembly as described in claim 30, wherein the openings of the combiner body are rectangular in shape.*

*32. The optical connector assembly as described in claim 31, wherein two slots are defined through two respective side walls of the combiner body.*

*33. The optical connector assembly as described in claim 32, wherein each slot is in communication with a corresponding opening.*

*34. The optical connector assembly as described in claim 21, wherein the trigger arm extends at an angle from the combiner body.*

*35. The optical connector assembly as described in claim 34, wherein the trigger arm includes a serrated outer surface for manual pressing.*

*36. The optical connector assembly as described in claim 35, wherein a rod extends laterally on either side of the free end of the trigger arm.*

*37. The optical connector assembly as described in claim 34, wherein the free ends of the trigger and latching arms extend an equal distance from the upper surface of the connector body.*

*38. An optical connector assembly for securing together a pair of optical connectors, each of the optical connectors having a connector body and a resilient latching arm secured to an upper surface of the connector body, the latching arm having a free end and an uppermost surface, the connector assembly comprising:*

*a combiner securing together the optical connectors;*

*a resilient trigger arm carried by the combiner and having a free end and an uppermost surface; and*

*a linking member coupling each of the free ends of the latching arms with the free end of the trigger arm, wherein the uppermost surfaces of the trigger and latching arms extend an equal distance from the upper surface of the connector body and depression of the trigger arm causes depression of each of the latching arms.*

*39. The optical connector assembly as described in claim 38, wherein the combiner defines two openings, each for receiving one of the optical connectors therein.*

*40. The optical connector assembly as described in claim 38, wherein each latching arm further comprises:*

*a first portion extending at an angle from the connector body; and*

*a second portion extending from the first portion substantially parallel to the corresponding connector body, wherein the first and second portions are joined at an obtuse angle.*

*41. The optical connector assembly as described in claim 38, wherein each latching arm extends at a shallow angle from the upper surface of the corresponding connector body.*

*42. The optical connector assembly as described in claim 38, further comprising:*

*a protrusion formed on the exterior of the connector body, wherein the protrusion assists in*

*positioning the combiner on the connector body.*

*43. The optical connector assembly as described in claim 38, wherein the linking member further comprises:*

*a rod having an end extending from each side of the free end of the trigger arm; and*

*a groove formed in each free end of each latching member, wherein the groove releasably receives one end of the rod.*

*44. The optical connector assembly as described in claim 43, wherein the groove further comprises:*

*an entrance aperture and a receiving slot in communication with the entrance aperture, wherein the entrance aperture allows entrance of the rod into the receiving slot, and wherein the entrance aperture is constricted so as to prevent the rod from coming out of the groove accidentally, and the rod is slideably received in the receiving slot.*

*45. The optical connector assembly as described in claim 39, wherein the openings of the combiner are rectangular in shape.*

*46. The optical connector assembly as described in claim 39, wherein two slots are defined through two respective side walls of the combiner.*

*47. The optical connector assembly as described in claim 46, wherein each slot is in communication with a corresponding opening.*

*48. The optical connector assembly as described in claim 38, wherein the trigger arm extends at an angle from the combiner.*

*49. The optical connector assembly as described in claim 38, wherein the trigger arm includes a serrated outer surface for manual pressing.*

*50. The optical connector assembly as described in claim 38, wherein the rod extends laterally on either side of the free end of the trigger arm.*

*51. A cable connector assembly comprising:*

*at least one cable connector having a body and a resilient latching arm extending from an upper surface of the body, the latching arm having a distal end and an uppermost surface;*

*a combiner dimensioned to engage the body;*

*a resilient trigger arm extending from the combiner and having a distal end and an uppermost surface; and*

*a linking member coupling together the distal end of the latching arm and the distal end of the trigger arm, wherein the uppermost surfaces of the trigger and latching arms extend an equal distance from the upper surface of the body and depression of the trigger arm causes depression of the latching arm.*

*52. The cable connector assembly of claim 51, wherein the at least one cable connector comprises a pair of cable connectors and the combiner has a pair of openings dimensioned to receive and engage the bodies of the pair of cable connectors.*

*53. The cable connector of claim 51, wherein the linking member further comprises:*

*a rod having an end extending from each side of the distal end of the trigger arm; and*

*a groove formed in each distal end of each latching member, wherein the groove releasably receives one end of the rod.*

*54. The optical connector of claim 53, wherein the groove further comprises:*

*an entrance aperture and a receiving slot in communication with the entrance aperture, wherein the entrance aperture allows entrance of the rod into the receiving slot, and wherein the entrance aperture is constricted so as to prevent the rod from coming out of the groove accidentally, and the rod is slideably received in the receiving slot.*

* * * * *